United States Patent [19]

Umeda et al.

[11] 3,979,718

[45] Sept. 7, 1976

[54] METHOD OF DRIVING A PLASMA DISPLAY PANEL

[75] Inventors: Shozo Umeda, Kakogawa; Tadatsugu Hirose, Akashi; Shizuo Andoh, Kobe, all of Japan

[73] Assignee: Fujitsu Ltd., Kawasaki, Japan

[22] Filed: Jan. 10, 1975

[21] Appl. No.: 539,969

Related U.S. Application Data

[63] Continuation of Ser. No. 317,643, Dec. 22, 1972.

[30] Foreign Application Priority Data

Dec. 23, 1971 Japan .............................. 46-104841

[52] U.S. Cl. ...................... 340/324 M; 315/169 TV; 340/343

[51] Int. Cl.$^2$ ............................................ G06F 3/14

[58] Field of Search ........... 340/343, 324 R, 324 M; 315/169 TV

[56] References Cited

UNITED STATES PATENTS

| | | | |
|---|---|---|---|
| 3,644,925 | 2/1972 | Kupsky | 340/324 M |
| 3,683,364 | 8/1972 | Holz et al. | 340/324 M |

*Primary Examiner*—Marshall M. Curtis
*Attorney, Agent, or Firm*—Staas & Halsey

[57] ABSTRACT

A plasma display panel driving method and system in which a specified one of the panel cells is discharged at all times and electrons produced by the discharge serve as initial electrons for the other display cells, thereby to increase the writing response speed of the display cells and ensure achievement of writing operation.

10 Claims, 13 Drawing Figures

FIG. 4A
FIG. 4B
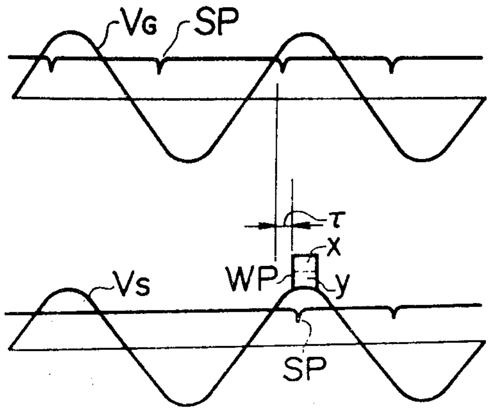
FIG. 5A
FIG. 5B
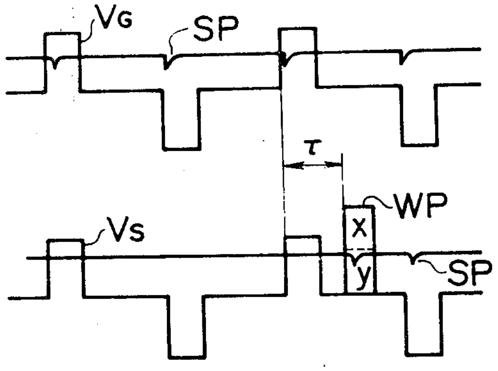
FIG. 6
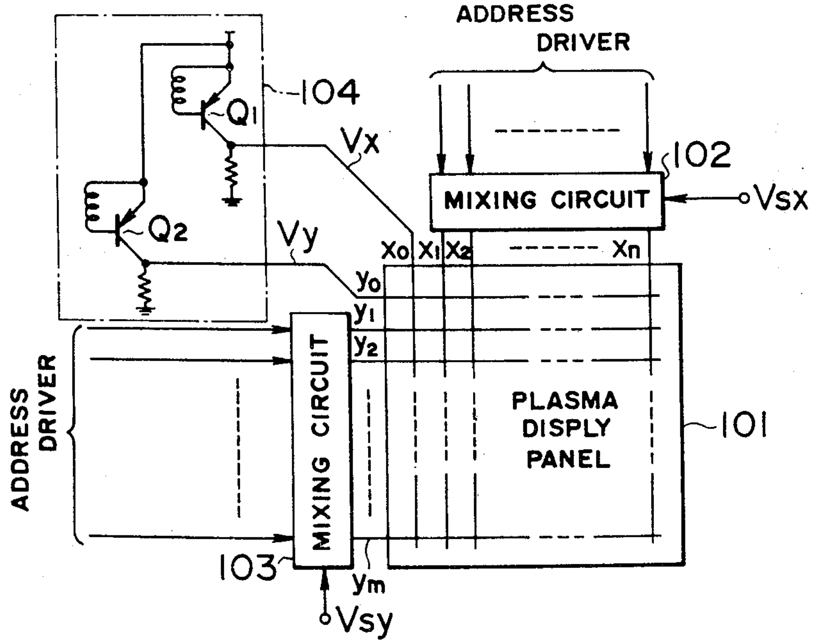

METHOD OF DRIVING A PLASMA DISPLAY PANEL

This is a continuation of application Ser. No. 317,643, filed Dec. 22, 1972.

BACKGROUND OF THE INVENTION

1. Field of the Invention

This invention relates to a plasma display panel driving method and system, and more particularly to a plasma display panel driving method and system which ensures achievement of writing at high response speed to provide a display.

2. Description of the Prior Art

As is well-known in the art, in a plasma display panel (hereinafter referred to as a PDP), electrodes covered with dielectric layers are disposed opposite to each other with a discharge gas space defined therebetween. In the case of providing a display by discharge between the electrodes supplied with an alternating sustain voltages, a write pulse is impressed to selected ones of the electrodes in such a manner as to exceed a firing voltage.

As shown in FIG. 1, there is formed between electrodes X and Y an equivalent circuit in which capacitances Ct of the dielectric layers and that Cw of a cell defined between the electrodes X and Y are connected in series with one another. Where a sustain voltage Vs such, for example, as depicted in FIG. 2 is previously impressed to the electrodes X and Y and a write pulse $V_w$ is impressed thereto while superimposed on the peak of the sustain voltage $V_S$, the resulting amplitude value exceeds a firing voltage $V_F$ to cause ionization of a gas sealed in a cell between the electrodes X and Y, thus producing a discharge.

By the discharge, a wall charge is stored in either one of the dielectric layer according to the polarity of the impressed voltage to provide a wall voltage $V_Q$. With the wall voltage $V_Q$, the voltage applied to the cell becomes such that $V_W–V_F$ and it becomes lower than the firing voltage $V_F$, thus stopping the discharge.

The wall voltage $V_Q$ remains for a certain period of time because the wall charge stored in the dielectric layer is not rapidly extinguished even after the write pulse $V_W$ and the sustain voltage $V_S$ have been reduced to zero. Namely, once a discharge is produced by writing, it is stored in the form of a wall charge.

In the next half cycle of the sustain voltage $V_S$, a discharge is caused again when the potential difference between the wall voltage $V_Q$ and the sustain voltage $V_S$ exceeds the firing voltage $V_F$ and, in this case, the polarity of the wall voltage $V_Q$ is reversed. Namely, discharge is repeatedly produced at every half cycle of the sustain voltage $V_S$ to provide a display.

In the case of erasing the display thus provided, an erasing pulse $V_E$ is impressed when the value of the sustain voltage $V_S$ is relatively low and the potential difference between it and the wall voltage $V_Q$ is far smaller than the firing voltage $V_F$. The erasing pulse $V_E$ is selected to be of such an amplitude value that the difference between the superimposed value of the erasing pulse $V_E$ and the sustain voltage $V_S$, and the wall voltage $V_Q$ is a little greater than the firing voltage $V_F$. With the erasing pulse $V_E$, the cell is discharged but no wall voltage of opposite polarity is thereby generated, so that no discharge is produced by the sustain voltage applied after a half cycle.

With such a PDP, a memory display is possible and its erasing is freely controllable. However, its operation is mainly dependent on the gas discharge, and hence has an operation time lag characteristic due to a firing time T f and a statistical time lag Ts determined by the number of electrons initially ionizing the gas and causing avalanche until a steady space charge distribution by discharge is formed after the impression of the write pulse $V_w$, as is the case with a typical usual discharge tube. The time lag Ts is usually greater than the firing time Tf. For example, where the generation of initial electrons by light excitation is limited by disposing the PDP in a dark place or where the PDP is not used for a long time, the operation lag time increases and no discharge is produced by applying one write pulse only and, in some cases, no discharge is generated unless the write voltage is impressed for a period of several milliseconds to several seconds. Thus, the time lag Ts is very large, as compared with the firing time Tf which is about 1$\mu$sec., so that the time lag is likely to cause an erroneous display.

SUMMARY OF THE INVENTION

On object of this invention is to provide a novel plasma display panel driving method and system which is free from the aforementioned defects experienced in the prior art and avoids an erroneous display.

Another object of this invention is to provide a plasma display panel driving method and system which provides for increased writing response speed.

Briefly stated, the plasma display panel driving and system according to this invention is such that a specified cell of the PDP is held in its discharging condition and initial electrons produced by the discharge are supplied to other cells to decrease the time lag Ts. Further, the timing for discharging the specified cell is selected equal to or a little earlier than that for the impression of the write pulse.

Other objects, features and advantages of this invention will become apparent from the following description taken in conjunction with the accompanying drawings.

BRIEF DESCRIPTION OF THE DRAWINGS

FIGS. 4A and 4B are waveform diagrams, for explaining the operation in the case of using sine-wave priming and sustain voltages;

FIGS. 5A and 5B are waveform diagrams, for explaining the operation in the case of employing firing and sustain voltages, each composed of positive and negative pulses;

FIG. 6 is a block diagram showing another embodiment of this invention;

DESCRIPTION OF THE PREFERRED EMBODIMENTS

Figure 1:
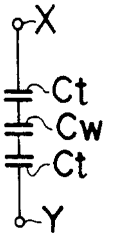
FIG. 1 is a diagram showing an equivalent circuit of a cell of a PDP.
Figure 2:
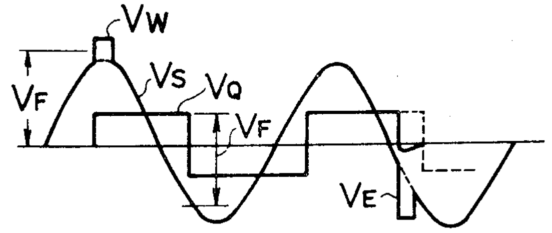
FIG. 2 is a waveform diagram, for explaining writing and erasing operation PDP.
Figure 3:
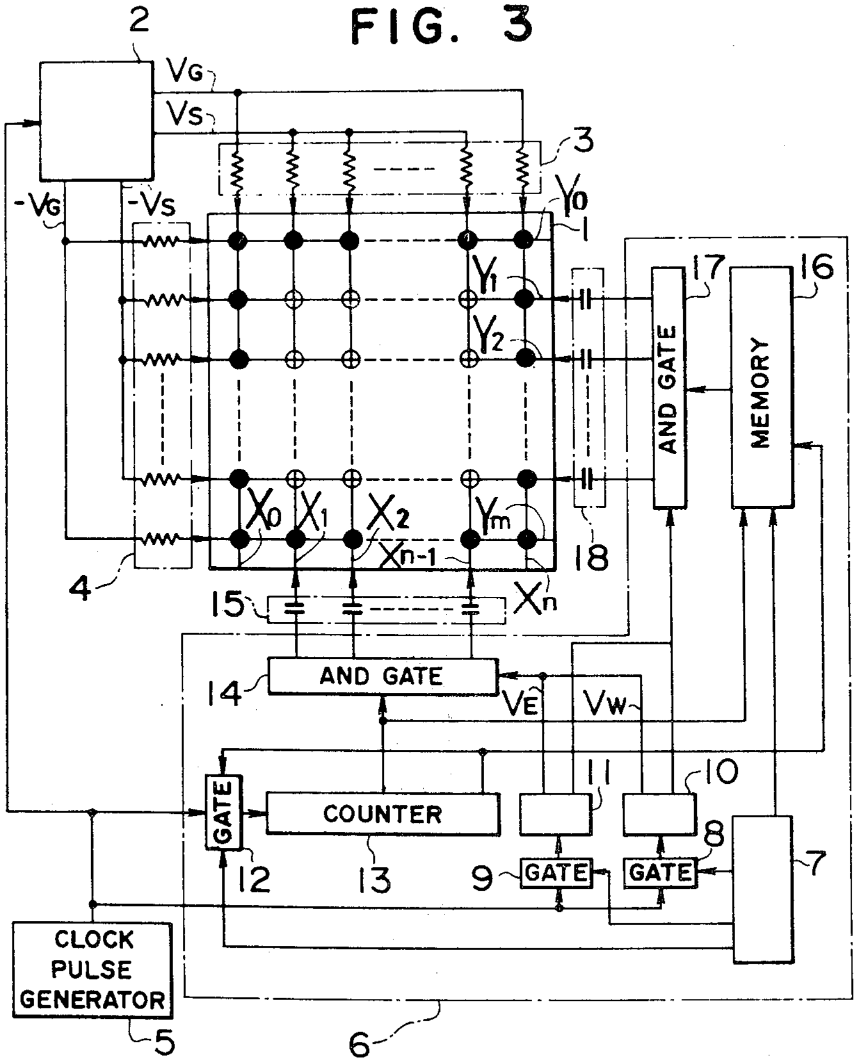
FIG. 3 is a block diagram illustrating one embodiment of this invention.

FIG. 3 shows in block form one embodiment of this invention, in which referencc numeral 1 indicates a PDP, 2 a drive power source for producing a sustain voltage $V_S$ and a priming voltage $V_G$ synchronized with a clock pulse, 3 and 4 series impedance groups, 5 a clock pulse generator, 6 a matrix control circuit, 7 an actuating section, 8 and 9 gate circuits, 10 write pulse generator, 11 an erasing pulse generator, 12 a gate circuit, 13 a counter, 14 and 17 AND gate circuit groups, 15 and 18 series impedance groups, and 16 a temporary memory circuit.

The drive power source 2 generates sustain voltages $+V_S$ and $-V_S$ as in the prior art but, in addition, produces priming voltages $+V_G$ and $-V_G$, which are impressed to column and row electrodes Xo, Xn, Yo and Ym on both sides of the PDP 1 to cause discharge in cells overlying these electrodes at all times.

Let it be assumed that the PDP 1 has the following characteristics:

Firing voltage $V_F = 400V$

Maximum allowable voltage $V_{FC} = 600V$

Minimum sustain voltage $V_{Smin} = 300V$

The priming voltage $V_G$ and the sustain voltage $V_S$ are selected 250V and 180V at their peak values respectively. Accordingly, voltage in the cells at the intersecting points of the electrodes supplied with the priming voltage $V_G$ are 500V, and thus higher than the firing voltage $V_F$. Also in those cells supplied with the both priming and sustain voltages, the potential difference between the electrodes is such that $V_G-(-V_S)=430V$ in excess of the firing voltage $V_F$ and, as a result, discharge is produced. These cells in their discharging condition are fire priming cells, which are indicated by black circles in FIG. 3.

With such specified cells being held in a discharging condition, electrons generated by the discharge are injected to other display cells (indicated by circles), thereby to decrease the aforementioned statistical time lag Ts. As a result of this, writing in the cells, that is, firing can be positively effected even with one write pulse having a pulse width of only about 2$\mu$sec.

The aforesaid matrix control circuit 6 is a known one, whose operation will hereinbelow be described. By pushing a write button in the actuating section 7, the gate circuit 8 is opened, through which a clock pulse from the clock pulse generator 5 is applied to the write pulse generator 10 to derive therefrom a write pulse corresponding to the clock pulse, which is supplied to the AND gate circuit groups 14 and 17. Then, by pushing a second character push-button an address signal necessary for the indication of the character is applied to the temporary memory circuit 16 to store therein the addresses of the Y electrodes for each X electrode defining intersections or discharge points at which discharges are to be produced for display of the desired character. While, by the pushing of the character button, a writing start pulse is applied to the gate circuit 12 to open it, through which the clock from the clock pulse generator 5 are supplied to the counter 13 to achieve counting of the clock pulses and, in accordance with the counted content, the gates of the AND gate circuit group 14 are sequentially opened. As a result of this, the write pulse supplied to the AND gate circuits in common to them is sequentially impressed to the X electrodes.

At the same time, the counted content of the counter 13 is applied to the temporary memory circuit 16 to read out the address signals stored therein and the read-out signals are applied to the AND gate circuit group 17, by which the write pulse fed to the AND gate circuits in common to them is supplied to the Y electrodes corresponding to the address signals. Consequently, writing is sequentially carried out for every row and, upon completion of the writing to the last row, for example, a seventh row in the case of the character being displayed with 5×7 dots, the gate circuit 12 is closed by the counted output from the counter 13 and the temporary memory circuit 16 is reset to be ready for the subsequent writing.

In the case of erasing the display, by pushing an erasing button in the actuating section 7, an erasing pulse is impressed from the erasing pulse generator 11 in place of the aforesaid write pulse.

The above embodiment is of the so-called fast system in which the write and erasing pulses generated by the matrix control circuit 6 are pulses of smaller pulse width, as compared with the period of the sustain voltage but it is also possible to adopt the so-called slow system in which the pulse widths of the write and erasing pulses are several times as large as the period of the sustain voltage. Further, it is also possible to employ a system such that a writing or erasing control voltage is obtained by the phase control of a drive voltage as in the P.E oberg system using no pulse signal or in a system of driving with a composite voltage of a fundamental wave and a frequency three times as high as it. In the case of adopting these systems, if a drive power source suited to each system is employed, the clock pulse generator can be omitted because the matrix control circuit operates in synchronism with the drive voltage.

Where the priming voltage $V_G$ impressed to the aforementioned specified cells and the sustain voltage $V_S$ impressed to the display cells are sine waves as depicted in FIGS. 4A and 4B, discharge spots SP in the specified cells are produced at such a timing that the potential difference between the wall voltage and the priming voltage $V_G$ exceeds the firing voltage $V_F$. Further, a write pulse WP is applied as a half selection voltage to selected ones of the X and Y electrodes at a timing close to that of a maximum value of the sine wave to produce a discharge spot at that timing. In this case, the difference $\tau$ between the timing of the discharge spot SP in the specified cell and that of the write pulse WP is only several microseconds, so that the supply of a priming firing voltage, that is, the initial electrons effectively acts on the writing operation.

However, the use of the sine wave sustain voltage exerts an influence on the half selected cells at the time of writing and erasing, that is, there are great possibilities of causing a half selection trouble that writing or erasing is achieved in the half selected electrodes.

To avoid this, it is considered to compose each of the priming voltage $V_G$ and the sustain voltage $V_S$ of a small pulse whose polarity alternates, i.e., reverses, as shown in FIGS. 5A and 5B respectively. In this case, the write pulse WP is impressed at the timing depicted in FIG. 5B and the difference $\tau$ between the timing of the discharge spot SP and that of the write pulse WP becomes about 5 to 10$\mu$sec. resulting in a reduction in the fire priming effect. Accordingly, the fire priming effect can be enhanced by decreasing the difference $\tau$.

FIG. 6 illustrates in block form another embodiment of this invention which is designed to enhance the fire priming effect described above. A PDP 101 has provided thereon electrodes Xo to Xn and Yo to Yn in a matrix form and the electrodes Xo and Yo have connected thereto a fire priming voltage generator 104 comprising, for example, transistors Q1 and Q2. The electrodes X1 to Xn and Y1 to Ym are supplied with sustain voltages $V_{SX}$ and $V_{SY}$ through mixing circuits 102 and 103 respectively. The mixing circuits 102 and 103 are connected to X- and Y-side address drivers respectively and supplied with writing or erasing information.

Figure 7:
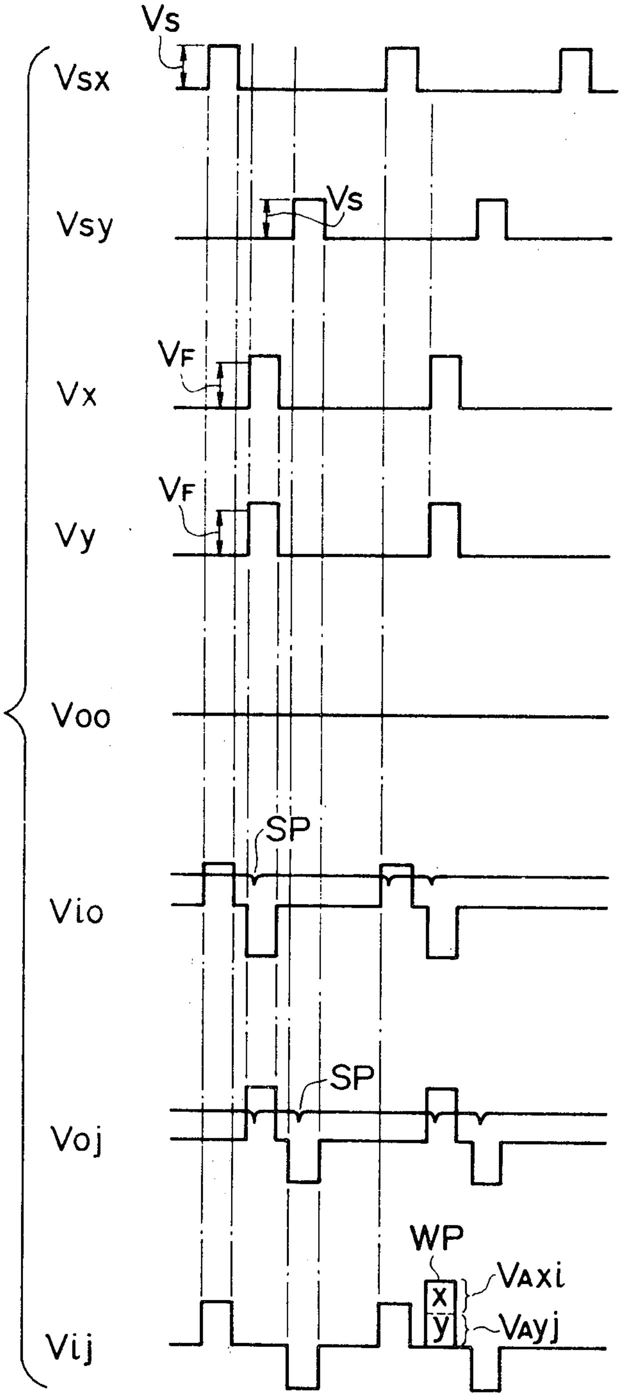
FIG. 7 shows a series of waveforms, for explaining the operation of the embodiment of FIG. 6.

The sustain voltages $V_{SX}$ and $V_{SY}$ impressed to the electrodes X1 to Xn and Y1 to Yn respectively are composed of pulses of different phases as indicated by $V_{SX}$ and $V_{SY}$ in FIG. 7. Priming voltages $V_X$ and $V_Y$ impressed to the electrodes Xo and Yo are composed of pulses such as indicated by $V_X$ and $V_Y$ in FIG. 7 which are of the same phase and whose peak values are higher than the firing voltage $V_F$ respectively.

Accordingly, no voltage is impressed to the cell between the electrodes Xo and Yo as indicated by Voo in FIG. 7 and a voltage indicated by Vio is impressed to the cells between the electrodes $Xi(i=1, 2, 3 \ldots n)$ and Yo to produce discharge therebetween repeatedly at a timing indicated by SP. Further, a voltage indicated by Voj is impressed to the cells between the electrodes Xo and $Yj(j=1, 2, 3 \ldots n)$ to produce discharge therebetween repeatedly at a timing indicated by SP. These cells serve as fire priming cells and those between the other electrodes Xi and Yj serve as display cells, to which is impressed a sustain voltage indicated by Vij in FIG. 7.

The timing for supplying selected ones of the electrodes with the write pulse, which is the sum of half selection voltages $V_{AXi}$ and $V_{AYj}$, is set to be the same as that of discharge in the fire priming cells or a little delayed behind it. Accordingly, it is possible to achieve writing sufficiently utilizing the fire priming effect. The speed of diffusion of the initial electrons due to the fire priming is very high, so that the fire priming effect can also be exerted on the display cells apart from the fire priming cells.

Figure 8:
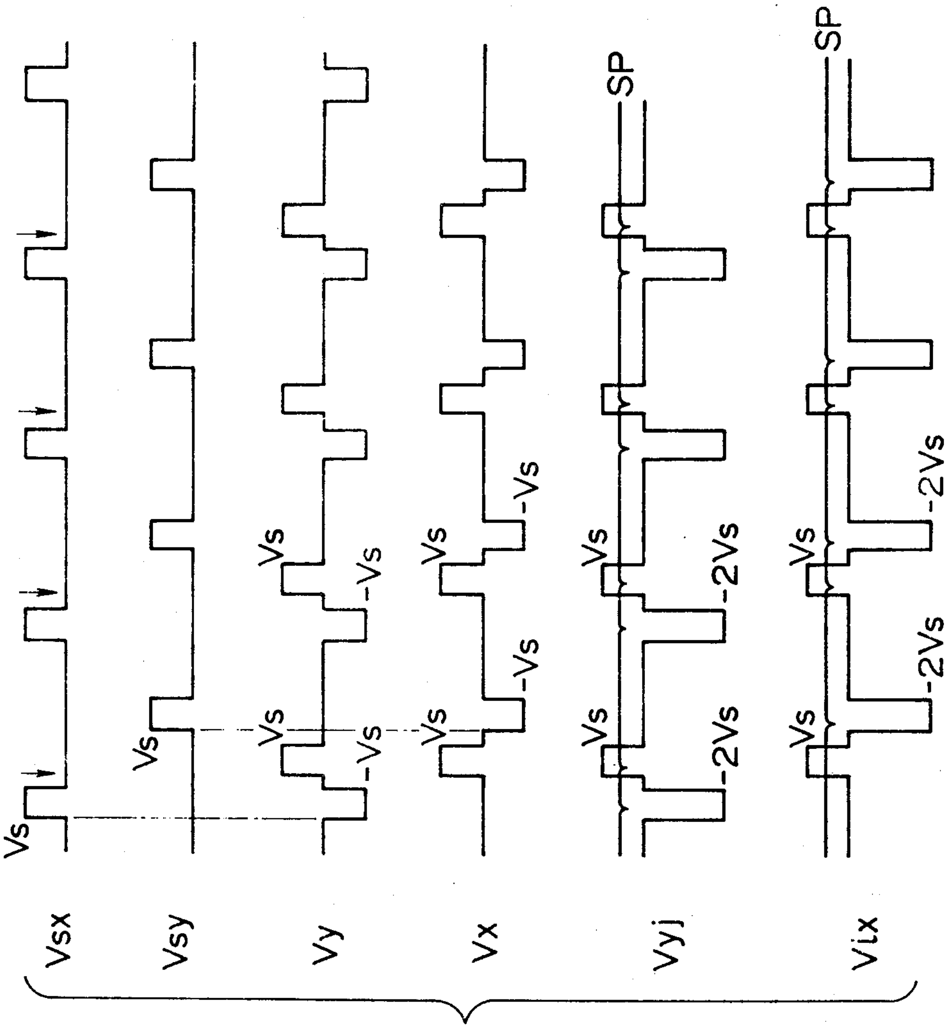
FIG. 8 shows a series of waveforms, for explaining the operation of another embodiment of this invention.

The waveforms of the fire priming voltages applied to the electrodes Xo and Yo may also be such as shown in FIG. 8. The fire priming voltages Vx and Vy are pulse trains, each composed of a positive (or negative) pulse $V_S$ coincident with the timing of writing indicated by arrows and a negative (or positive) pulse $-V_S$ which is superimposed on the sustain voltage $V_{SX}$ or $V_{SY}$ of each of the opposing electrodes to exceed the firing voltage, as will be apparent from FIG. 8. Thus, a voltage indicated by $V_{Yj}$ is impressed to the cells between the electrodes $Xi(i=1, 2, 3 \ldots n)$ and Yo, while a voltage $V_{iX}$ is impressed to the cells between the electrodes $Yj(j=1, 2, 3 \ldots n)$ and the electrode Xo. As a result of this, in the cells supplied with such voltages, a pulse voltage $-2V_S$ at every cycle exceeds the firing voltage, so that the discharge continues at the timing indicated by SP to serve as a priming fire for the other cells.

In the foregoing example, the fire priming voltages $V_X$ and $V_Y$ and the display sustain voltages $V_{SX}$ and $V_{SY}$ are equal in period to each other, but the period of the fire priming voltages can be selected to be an integral fraction of that of the sustain voltages, in which case the brightness of the fire priming cells is lowered, so that the display by the display cells can be made clear.

In the foregoing, the specified cells serving as fire priming cells are those located on the peripheral portion of the PDP, but it is also possible to use as a fire priming cell a desired one of the cells having no influence on the display of the PDP, for example, a cell between rows and columns of a character being displayed. This is suitable for a display on a large PDP.

In the case of a character display, a cursor is employed. In the prior art, the cursor is indicated by a discharge with a voltage from a sustain voltage source, so that the discharge is not produced at the timing of the impression of the write pulse. Conversely, if the timing of the discharge spot of the cursor is made coincident with that of the impression of the write pulse, the writing response speed can be enhanced as described previously by using the cursor indicating cell as a fire priming cell.

Figure 9:
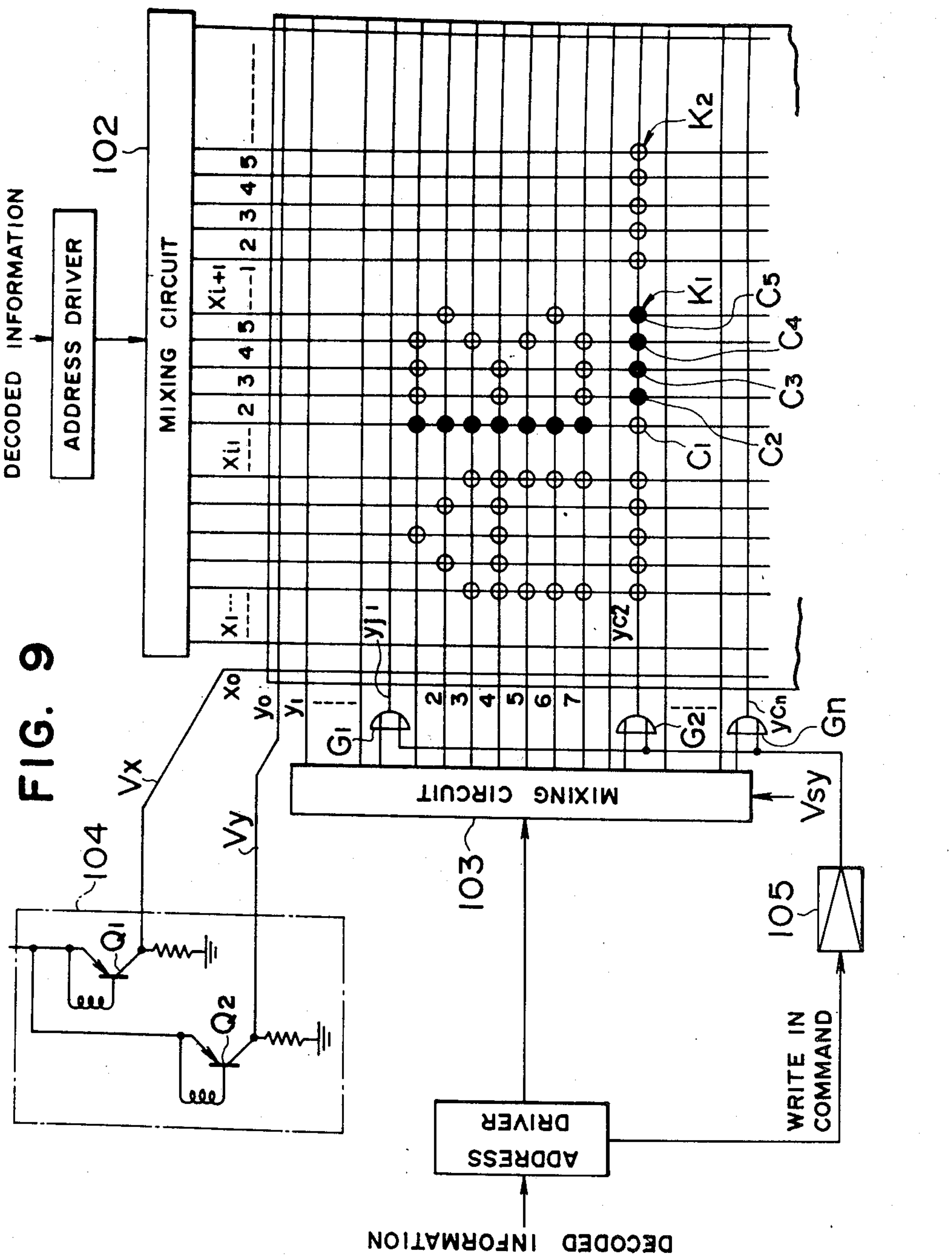
FIG. 9 is a block diagram illustrating still another embodiment of this invention.

FIG. 9 is a block diagram showing the case in which cursor indicating cells are used as fire priming cells in addition to the cells arranged on the peripheral portion of a PDP in a 5×7 dot character display apparatus. The parts corresponding to those in FIG. 6 are identified by the same reference numerals and characters. Let it be assumed that a character "A" and a cursor K1 indicating the next write-in position are displayed on the PDP 101 by sustain voltages $V_{SX}$ and $V_{SY}$ depicted in FIG. 10. Cursor lines $y_{cl}$, $y_{c2}$ . . . and $y_{cn}$ are connected through OR circuits G1, G2 . . . and Gn to the mixing circuit 103 and a cursor driver 105 in common to them. The cursor driver 105 responds to a write-in commond.

Figure 10:
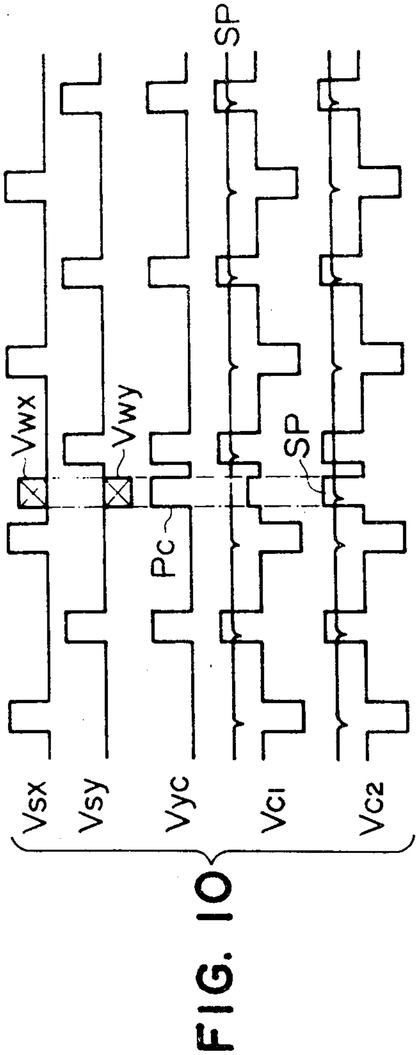
FIGS. 10 and 11 each show a series of waveforms, for explaining the operations of other embodiments of this invention.

In the above condition, introducing a command for a first row for writing a character "B" at the position corresponding to the cursor K1, write voltages Vwx and Vwy such as shown on the sustain voltages $V_{SX}$ and $V_{SY}$ in FIG. 10 are applied to the X electrode Xi1 of the first row and selected Y electrodes Yj(1 to 7) and, at the same time, a fire priming pulse PC such as indicated by Vyc in FIG. 10 is applied to the cursor line $Y_{c2}$ from the cursor driver 105. Consequently, a cursor cell C1 overlying the X electrode Xi1 of the first row impressed with the write voltage Vwx is supplied with such a voltage as indicated by VC1 in FIG. 10 and, at the time of writing, the write voltage Vwx and the fire priming pulse PC cancel each other and no discharge is produced in the cell C1. However, since no write voltage is impressed to the other cursor cells C2 to C5 from the side of the X electrodes, such a voltage is indicated by Vc2 in FIG. 10 is applied to these cells to cause discharge therein at the same timing as the writing. Thus, also in the case of writing the character B in second to fifth rows, discharge is similarly produced in cursor cells on other rows than those of the selected X electrodes at the same timing to provide the fire priming effect. In this case, the cells on the electrodes Xo and Yo, in which discharge is produced by the voltage from the fire priming power source 104, serve as fire priming cells as in the embodiment of FIG. 6.

Figure 11:
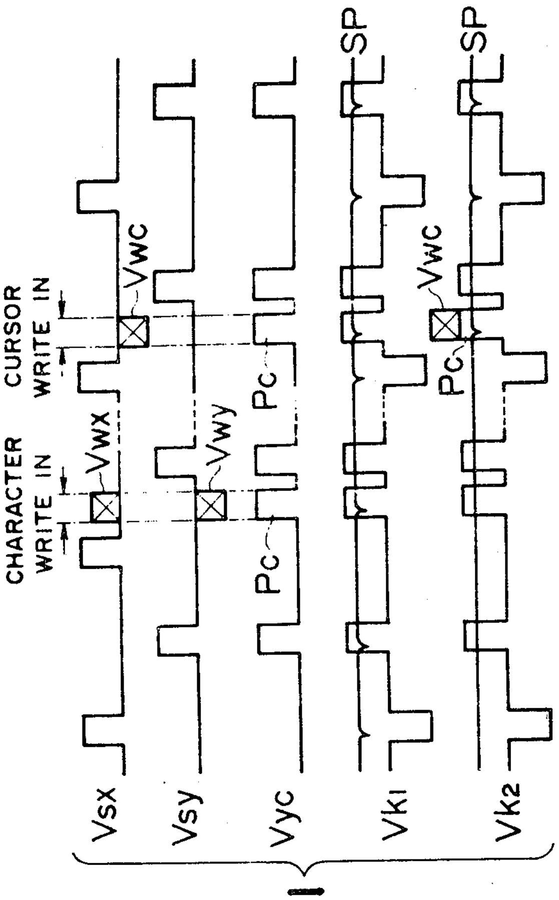

After writing one character as described above, it is necessary to shift the cursor to the next position. In this case, if the usual writing operation is employed, the fire priming effect from the adjacent cells of different discharge timing cannot be expected. With another improvement of this invention, however, it is possible to achieve writing of the next cursor utilizing the previous cursor cell as a fire priming cell. To facilitate an understanding of this, reference is made to FIG. 11. It is noted from this figure that the cursor write voltage Vwc is applied in the opposite polarity to the character write voltage Vwx. Consequently, the cell of the previous cursor K1 is discharged with the fire priming pulse PC derived from the cursor driver 105 based on the write-in demand as indicated by Vk1 and writing of the next cursor K2 is effected at the same timing as that at which the sum of the fire priming pulse PC and the cursor write voltage Vwc exceeds the firing voltage, as indicated by Vk2. After this cursor writing operation, the previous cursor K1 is erased at a desired timing.

It will be apparent that many modifications and variations may be effected without departing from the scope of the novel concepts of this invention.

What is claimed is:

1. A method of driving a plasma display panel having first and second pluralities of electrodes disposed to traverse each other in matrix form and each being covered with a dielectric layer whereby a plurality of display discharge points are formed across a confined discharge gas between said dielectric layers, a cursor indicating line being formed of selected discharge points associated with a third plurality of electrodes, wherein said method comprises the steps of:

a. applying a sustain voltage of substantially square wave form to said first, second and third pluralities of electrodes;

b. applying a write signal to selected ones of said first and second pluralities of electrodes defining selected display discharge points;

c. applying a priming pulse coincident in timing with said write signal to said third plurality of electrodes associated with said cursor indicating line establishing discharge across the cursor indicating discharge points at substantially the same timing as discharge is established by the writing signal across said selected display discharge points and d. continuing to apply said sustain voltage after said priming pulse and said write signal terminate, to maintain said discharge at said cursor indicating discharge points and said selected display discharge points.

2. A method of driving a plasma display panel as claimed in claim 1, wherein the cursor is formed at a first character position upon the plasma display panel and is shifted to a second character position, including the steps of applying a priming voltage coincident with a given timing to said third plurality of electrodes on the cursor indicating line, applying a write signal, superimposed on said priming voltage of such polarity and magnitude to exceed a firing voltage of the discharge points of the plasma display panel, to selected ones of said second plurality of electrodes corresponding to said second character position whereby discharge is caused at the cursor discharge points of said second character position and initial electrons from said discharge at said first character position prime selected display discharge points at the corresponding second character position.

3. A method of energizing a plasma display panel having first and second pluralities of row and column electrodes, respectively, disposed to traverse each other in matrix form, each being covered with a dielectric layer whereby a plurality of discharge points are formed across a confined discharge gas between said dielectric layers, said discharge points comprising display discharge and fire priming points and each having a given firing voltage, said method comprising the steps of:

a. applying periodically a fire priming voltage through at least one of said first and second electrodes associated with fire priming discharge points to the corresponding, at least one fire priming discharge point of sufficient magnitude to cause a discharge thereacross in time not later than the application of a write voltage to selected ones of the display discharge points, and of a polarity such that the discharge at the corresponding, said at least one fire priming discharge point is sustained by a sustain voltage pulse applied to electrodes traversing said at least one electrode associated with said at least one fire priming discharge point, whereby initial electrons from the discharge at said at least one fire priming discharge point serve to prime the display discharge points;

b. applying an alternating sustain voltage through selected ones of said first and second electrodes to the associated, selected ones of the display discharge points of sufficient magnitude to sustain a discharge in the selected ones of the display discharge points, but less than the magnitude of the firing voltage thereof; and c. selectively applying a write voltage which exceeds the firing voltage through a selected one of said first and second electrodes to the corresponding, said selected ones of the display discharge points at a predetermined timing in the interval of the sustain voltage.

4. A method of energizing a plasma display panel as claimed in claim 3, wherein the step of applying an alternating sustain voltage comprises applying first and second sustain voltages, each of substantially square wave form and of different phase, to respective ones of said first and second pluralities of electrodes associated with the display discharge points; further applying a train of sustain pulses through selected ones of said first plurality of electrodes corresponding to selected fire priming points; and said step of applying a fire priming voltage comprises applying a first train of priming pulses of a selected polarity and magnitude, through selected ones of said first plurality of electrodes to the corresponding, selected fire priming points, superimposed on the first train of sustain pulses such that the combined magnitudes of the first train of priming pulses and the train of sustain pulses exceeds the firing voltage of the selected fire priming points; applying a second train of priming pulses opposite in polarity to the first train of priming pulses and having substantially the same timing as the application of the write voltage, through selected ones of said second plurality of electrodes to the associated, selected fire priming points, whereby a discharge is caused by the second train of priming pulses at the given timing to effect priming of the display discharge points.

5. A method of energizing a plasma display panel as claimed in claim 3, wherein the sustain voltage is of a given period, and the period that the priming voltage is impressed to the one discharge point is an integral fraction of the given period of the sustain voltage.

6. A method of energizing a plasma display panel as claimed in claim 3, wherein the one discharge point to which the priming voltage is applied is disposed on a peripheral portion of the plasma display panel.

7. A method of energizing a plasma display panel having first and second pluralities of row and column electrodes, respectively, disposed to traverse each other in matrix form and each said plurality of electrodes being covered with a dielectric layer whereby a plurality of discharge points defined by the intersections of said row and column electrodes are formed across a discharge gas confined between said dielectric layers, said discharge points comprising display and fire priming discharge points defined by respectively associated ones of said row and column electrodes, said method comprising the steps of:

a. applying a sustain voltage pulse to those of said row and column electrodes associated with display discharge points;
b. selectively applying a write voltage pulse to the electrodes associated with said display discharge points at a predetermined timing synchronized with the application of said sustain voltage pulse; and
c. applying a priming voltage pulse to at least one of each of said row and column electrodes defining said fire priming discharge points, in which said priming voltage pulse (1) is of sufficient magnitude to cause a discharge at fire priming points formed at the intersecting points of said fire priming electrodes with the electrodes crossing them, (2) occurs in time not later than the timing of the application of said write voltage; and (3) is of such a polarity that the discharge at said fire priming points is sustained by said sustain voltage pulse.

8. A method of energizing a plasma display panel having first and second pluralities of row and column electrodes, respectively, disposed to traverse each other in matrix form and each said plurality of electrodes being covered with a dielectric layer whereby a plurality of discharge points defined by the intersections of said row and column electrodes are formed across a discharge gas confined between said dielectric layers, said discharge points comprising display and fire priming discharge points defined by respectively associated ones of said row and column electrodes, said method comprising the steps of:

a. applying sustain voltage pulses to those of said row and column electrodes associated with display discharge points;
b. selectively applying a write voltage pulse to said electrodes associated with said display discharge points at a predetermined timing synchronized with the application of said sustain voltage pulses; and
c. applying priming voltage pulses to at least one of each of said row and column electrodes selected as a fire priming electrode; and wherein:

said priming voltage pulses comprise first and second voltage pulses of opposite polarities, each said first priming voltage pulse being superimposed on a sustain voltage pulse applied to the electrodes traversing said fire priming electrode and having a voltage of such magnitude when superimposed with said sustain voltage pulse as to exceed a firing voltage at the discharge points formed at the intersecting points of said fire priming electrode and said traversing electrodes; said second priming voltage pulse having a voltage of sufficient magnitude to sustain discharge; and said first priming voltage pulse being applied at the same timing as the application of said sustain voltage pulse.

9. A display system comprising:

a plasma display panel including first and second pluralities of row and column electrodes, respectively, disposed to traverse each other in matrix form and each said plurality of electrodes being covered with a dielectric layer whereby a plurality of discharge points defined by the intersection of said row and column electrodes are formed across a discharge gas confined between said dielectric layers, said discharge points comprising display and fire priming discharge points defined by respectively associated ones of said row and column electrodes, a sustain voltage pulse generator connected to those of said row and column electrodes associated with display discharge points for applying a sustain voltage pulse to the said electrodes associated with said display discharge points;

an address driver for selectively applying a write voltage pulse to said electrodes associated with the display discharge points at a predetermined timing synchronized with the application of said sustain voltage pulse; and means for applying a priming voltage pulse to at least one of each of said row and column electrodes selected as a fire priming electrode, said priming voltage pulse applying means including means for producing a voltage of sufficient magnitude to cause a discharge at fire priming points formed at the intersecting points of each said fire priming electrode and the electrodes traversing them and of such a polarity that the discharge caused by the said priming voltage pulse at said fire priming points is sustained by said sustain voltage pulse; and means for controlling the timing of said voltage producing means to apply the voltage from said voltage producing means to said fire priming electrodes at a time not later than the time of application of the write voltage pulse from said address driver.

10. A display system comprising:

a plasma display panel including first and second pluralities of row and column electrodes, respectively, disposed to traverse each other in matarix form and each of said plurality of electrodes being covered with a dielectric layer whereby a plurality of discharge points defined by the intersection of said row and column electrodes are formed across a discharge gas confined between said dielectric layers, said discharge points comprising display and fire priming discharge points defined by respectively associated ones of said row and column electrodes, a sustain voltage pulse generator connected to those of said row and column electrodes associated with display discharge points for applying sustain voltage pulses to the said electrodes associated with said display discharge points;

an address driver for selectively applying write voltage pulses to said electrodes associated with the display discharge points at a predetermined timing synchronized with the application of said sustain voltage pulses; and means for applying a priming voltage pulse to at least one of each of said row and column electrodes selected as a fire priming electrode, said means including a voltage source for producing a voltage which is superimposed on the sustain voltage pulse applied from said sustain voltage pulse generator to the electrodes traversing said fire priming electrodes to establish a voltage at the discharge points defined thereby which exceeds a firing voltage of said discharge points;

priming voltage pulse generating means for producing alternately in opposite polarities a first pulse of the voltage of said voltage source and a second pulse of a voltage of sufficient magnitude to sustain a discharge following said first pulse; and means for controlling the timing of said priming voltage pulse generating means to apply said first priming voltage pulses from said priming voltage pulse generating means at the same timing as the application of said sustain voltage pulses from said address driver.

* * * * *

UNITED STATES PATENT AND TRADEMARK OFFICE
CERTIFICATE OF CORRECTION

PATENT NO. : 3,979,718

DATED : September 7, 1976

INVENTOR(S) : Shozo Umeda, Tadatsugu Hirose and Shizuo Andoh

It is certified that error appears in the above-identified patent and that said Letters Patent are hereby corrected as shown below:

Column 2, line 5, change "T f" to --$T_f$--.

Column 6, line 48, change "B" to --"B"--.

Signed and Sealed this

Sixteenth Day of November 1976

[SEAL]

*Attest:*

RUTH C. MASON
*Attesting Officer*

C. MARSHALL DANN
*Commissioner of Patents and Trademarks*